US008385517B2

(12) United States Patent
Lahtiranta et al.

(10) Patent No.: US 8,385,517 B2
(45) Date of Patent: Feb. 26, 2013

(54) REPLYING THROUGH DIFFERENT CHANNELS

(75) Inventors: Atte Lahtiranta, Mountain View, CA (US); Jari P. Hamalainen, Kangasala AS (FI); Ilpo Karjalainen, Oulu (FI)

(73) Assignee: Nokia Corporation, Espoo (FI)

( * ) Notice: Subject to any disclaimer, the term of this patent is extended or adjusted under 35 U.S.C. 154(b) by 1092 days.

(21) Appl. No.: 11/468,189

(22) Filed: Aug. 29, 2006

(65) Prior Publication Data

US 2008/0056454 A1 Mar. 6, 2008

(51) Int. Cl.
*H04M 11/00* (2006.01)

(52) U.S. Cl. .................................. 379/88.13; 379/88.14

(58) Field of Classification Search ............... 379/88.13, 379/88.14
See application file for complete search history.

(56) References Cited

U.S. PATENT DOCUMENTS

| | | | |
|---|---|---|---|
| 6,049,796 A | 4/2000 | Siitonen et al. | |
| 6,119,146 A | 9/2000 | Heller et al. | |
| 6,141,341 A * | 10/2000 | Jones et al. | 370/352 |
| 6,192,258 B1 | 2/2001 | Kamada et al. | |
| 6,509,913 B2 | 1/2003 | Martin, Jr. et al. | |
| 6,965,917 B1 | 11/2005 | Aloni et al. | |
| 7,035,674 B1 | 4/2006 | Holder et al. | |
| 7,272,662 B2 | 9/2007 | Chesnais et al. | |
| 2002/0107743 A1 | 8/2002 | Sagawa | |
| 2003/0013483 A1 | 1/2003 | Ausems et al. | |
| 2003/0197740 A1 | 10/2003 | Reponen | |
| 2004/0100497 A1 | 5/2004 | Quillen et al. | |
| 2004/0107272 A1 | 6/2004 | Manukyan | |
| 2004/0205241 A1 | 10/2004 | Aarnos et al. | |
| 2004/0252679 A1 | 12/2004 | Williams et al. | |
| 2005/0076110 A1 | 4/2005 | Mathew et al. | |
| 2005/0123118 A1* | 6/2005 | Terry et al. | 379/211.02 |
| 2005/0141691 A1* | 6/2005 | Wengrovitz | 379/211.02 |
| 2005/0182798 A1 | 8/2005 | Todd et al. | |
| 2006/0009243 A1 | 1/2006 | Dahan et al. | |
| 2006/0053379 A1 | 3/2006 | Henderson et al. | |
| 2006/0080432 A1 | 4/2006 | Spataro et al. | |
| 2006/0135142 A1 | 6/2006 | Repka | |
| 2006/0168204 A1 | 7/2006 | Appelman et al. | |
| 2007/0121885 A1 | 5/2007 | Sin et al. | |
| 2007/0226360 A1 | 9/2007 | Gupta et al. | |
| 2008/0005325 A1 | 1/2008 | Wynn et al. | |
| 2008/0059627 A1 | 3/2008 | Hamalainen et al. | |

FOREIGN PATENT DOCUMENTS

| | | |
|---|---|---|
| EP | 1 043 905 A2 | 10/2000 |
| EP | 1 439 674 A2 | 7/2004 |
| EP | 1 659 766 A1 | 5/2006 |
| JP | 2003-298721 A | 10/2003 |
| WO | WO 03/092248 A2 | 11/2003 |

(Continued)

OTHER PUBLICATIONS

International Search Report and Written Opinion for Application No. PCT/IB2007/002443 dated Jun. 18, 2008.

(Continued)

*Primary Examiner* — Alexander Jamal
(74) *Attorney, Agent, or Firm* — Alston & Bird LLP (57) ABSTRACT

An apparatus includes a display and a processor connected to the display. The processor being configured to transmit at least one reply communication in response to an incoming communication, the at least one reply communication being formatted by the processor for a communication protocol that is different from a communication protocol of the incoming communication.

24 Claims, 7 Drawing Sheets

FOREIGN PATENT DOCUMENTS

| WO | WO 2004/027559 A2 | 4/2004 |
|---|---|---|
| WO | WO 2007/008321 A2 | 1/2007 |
| WO | WO 2007/131060 A2 | 11/2007 |

OTHER PUBLICATIONS

International Search Report and Written Opinion for Application No. PCT/IB2007/002441 mailed Apr. 3, 2008.
Office Action for Chinese Application No. 200780038009.X dated Dec. 31, 2011.
Preliminary Office Action for Korean Application No. 2009-7006334 dated Nov. 25, 2011.
Office Action for Russian Application No. 2009110949/08(014832) dated Jun. 11, 2010.
Office Action for Korean Application No. 2009-7006334 dated Aug. 26, 2010.
Office Action for Chinese Application No. 200780038009.X dated Oct. 13, 2010.
Preliminary Office Action for Korean Application No. 2009-7006334 dated Feb. 22, 2011.
Office Action for Chinese Application No. 200780037929.X dated Apr. 13, 2011.
Office Action for Chinese Application No. 200780037929.X dated Jun. 12, 2010.
U.S. Appl. No. 11/468,192, filed Aug. 29, 2006, in re: Lahtiranta entitled *Active Idle Extension*.
Office Action for U.S. Appl. No. 11/468,192 dated Jun. 8, 2009.
Office Action for U.S. Appl. No. 11/468,192 dated Jan. 6, 2010.
U.S. Appl. No. 11/468,182, filed Aug. 29, 2006; in re: Lahtiranta entitled *Voice Mail Extension*.
Office Action for U.S. Appl. No. 11/468,182 dated Oct. 6, 2010.
Office Action for U.S. Appl. No. 11/468,182 dated May 9, 2011.
Office Action for U.S. Appl. No. 11/468,182 dated Aug. 16, 2011.
Office Action for U.S. Appl. No. 11/468,182 dated Mar. 13, 2012.
U.S. Appl. No. 11/468,163 dated Aug. 29, 2006, in re: Hamalainen entitled *Unified Contact Database*.
Office Action for U.S. Appl. No. 11/468,163 dated May 12, 2009.
Office Action for U.S. Appl. No. 11/468,163 dated Dec. 8, 2009.
Office Action for U.S. Appl. No. 11/468,163 dated Dec. 6, 2010.
Office Action for U.S. Appl. No. 11/468,163 dated May 23, 2011.
U.S. Appl. No. 11/468,184, filed Aug. 29, 2006, in re: Lahtiranta entitled *Mobile Communication Device*.
Office Action for U.S. Appl. No. 11/468,184 dated Feb. 19, 2010.
Office Action for U.S. Appl. No. 11/468,184 dated Jul. 16, 2010.
Office Action for U.S. Appl. No. 11/468,184 dated Mar. 2, 2011.
Office Action for U.S. Appl. No. 11/468,184 dated Aug. 9, 2011.
Extended Search Report from European Patent Application No. 07804823.8, dated Oct. 10, 2012.

* cited by examiner

REPLYING THROUGH DIFFERENT CHANNELS

CROSS REFERENCE TO RELATED APPLICATIONS

This application is related to the following U.S. patent applications: "UNIFIED CONTACT DATABASE", Ser. No. 11/468,163; "VOICE MAIL EXTENSION", Ser. No. 11/468,182; "ACTIVE IDLE EXTENSION", Ser. No. 11/468,192; and "MOBILE COMMUNICATION DEVICE", Ser. No. 11/468,184, all of which were filed on Aug. 29, 2006, the disclosures of which are incorporated herein by reference in their entirety.

BACKGROUND

1. Field

The disclosed embodiments relate to communication devices and, more particularly, to communication devices with multi-channel communication.

2. Brief Description of Related Developments

Mobile terminals, or mobile (cellular) telephones, for mobile telecommunications systems like GSM, UMTS, D-AMPS, and CDMA2000 have been used for may years now. In the older days, mobile terminals were used almost exclusively for voice communication with other mobile terminals or stationary telephones. More recently, the use of modern terminals has been broadened to include not just voice communication, but also various other services and applications such as www/wap browsing, video telephony, electronic messaging (e.g. SMS, MMS, email, instant messaging), digital image or video recording, FM radio, music playback, exercise analysis, electronic games, calendar/organizer/time planner, word processing, etc. Furthermore, the modern terminals have local connectivity abilities, such as Bluetooth, allowing the mobile terminals to communicate with a wide array of devices.

With this great number of applications, user interaction naturally becomes complex and somewhat difficult. For example, in conventional terminals when a certain type of communication is received (e.g. a cellular communication, MMS, SMS, IM, etc.) a reply to that communication is made using the same communication protocol. For example, if user A initiates a cellular call that is received by a mobile phone of user B, user B either picks up the call or rejects the call. Where, for example user B is in a situation that user B cannot talk on the phone, user B may decline the call so that the call is sent into the user B's voice mail or user B may not answer the call without any explanation. User A may keep trying to call user B, creating a constant interruption to User B's activity (e.g. a meeting, in a movie theater).

To keep user A from interrupting user B's activities, user B may either answer the call, return the call to user A via another cellular communication, decline the call or turn the mobile phone off. User B may also respond to the call, after declining the call or at a later time, through a completely separate communication, such as an instant message that is unrelated to the received call. In conventional communication devices to send a separate communication, such as an instant message, in response to an incoming call a user must decline or reject the call or wait for the call to stop ringing and then search through the menus of the communication device to find the instant message function of the communication device. In conventional communication devices, if there is more than one service provider associated with instant messaging, the user has to find the appropriate screen or interface within the communication device that corresponds to the desired service provider as each service provider has its own dedicated user interface.

One attempt to simplify the use of mobile terminals is to use two dimensional menus, allowing the user to see a large number of selectable applications simultaneously. However, switching from one application to the next is still a process which requires relatively intense attention by the user, even for the most common applications.

Consequently, there is a need to provide a mobile communication terminal and method providing a user interface with a simpler and more intuitive selection for replying to incoming communications.

SUMMARY

In one embodiment, an apparatus is provided. The apparatus includes a display and a processor connected to the display. The processor being configured to transmit at least one reply communication in response to an incoming communication, the at least one reply communication being formatted by the processor for a communication protocol that is different from a communication protocol of the incoming communication.

In another embodiment, a method is provided. The method includes receiving an incoming communication and responding to the incoming communication wherein at least one reply communication is transmitted in response to the incoming communication, the at least one reply communication is formatted for a communication protocol that is different from a communication protocol of the incoming communication.

In one embodiment a computer program product is provided. The computer program product includes a computer useable medium having computer readable code means embodied therein for causing a computer to transmit at least one reply communication in response to an incoming communication. The computer readable code means in the computer program product includes computer readable code means for causing a computer to transmit at least one communication in reply to an incoming communication, the at least one reply communication being formatted for a communication protocol that is different from a communication protocol of the incoming communication, the at least one reply communication being transmitted using a service provider that is different from a service provider of the incoming communication.

In another embodiment, a user interface is provided. The user interface includes at least one display area configured to display a name of a party associated with an incoming communication, a service provider type associated with the incoming communication, and a response option to the user, the response option being configured to allow the user to respond to the incoming communication with at least one reply communication.

In one embodiment, an apparatus is provided. The apparatus includes a means for transmitting at least one message in reply to an incoming call, the at least one reply message being formatted for a communication protocol that is different from a communication protocol of the incoming call, the at least one one reply message being transmitted using a service provider that is different from a service provider of the incoming call.

BRIEF DESCRIPTION OF THE DRAWINGS

The foregoing aspects and other features of the disclosed embodiments are explained in the following description, taken in connection with the accompanying drawings, wherein.

DETAILED DESCRIPTION OF THE EXEMPLARY EMBODIMENT(S)

Figure 1:
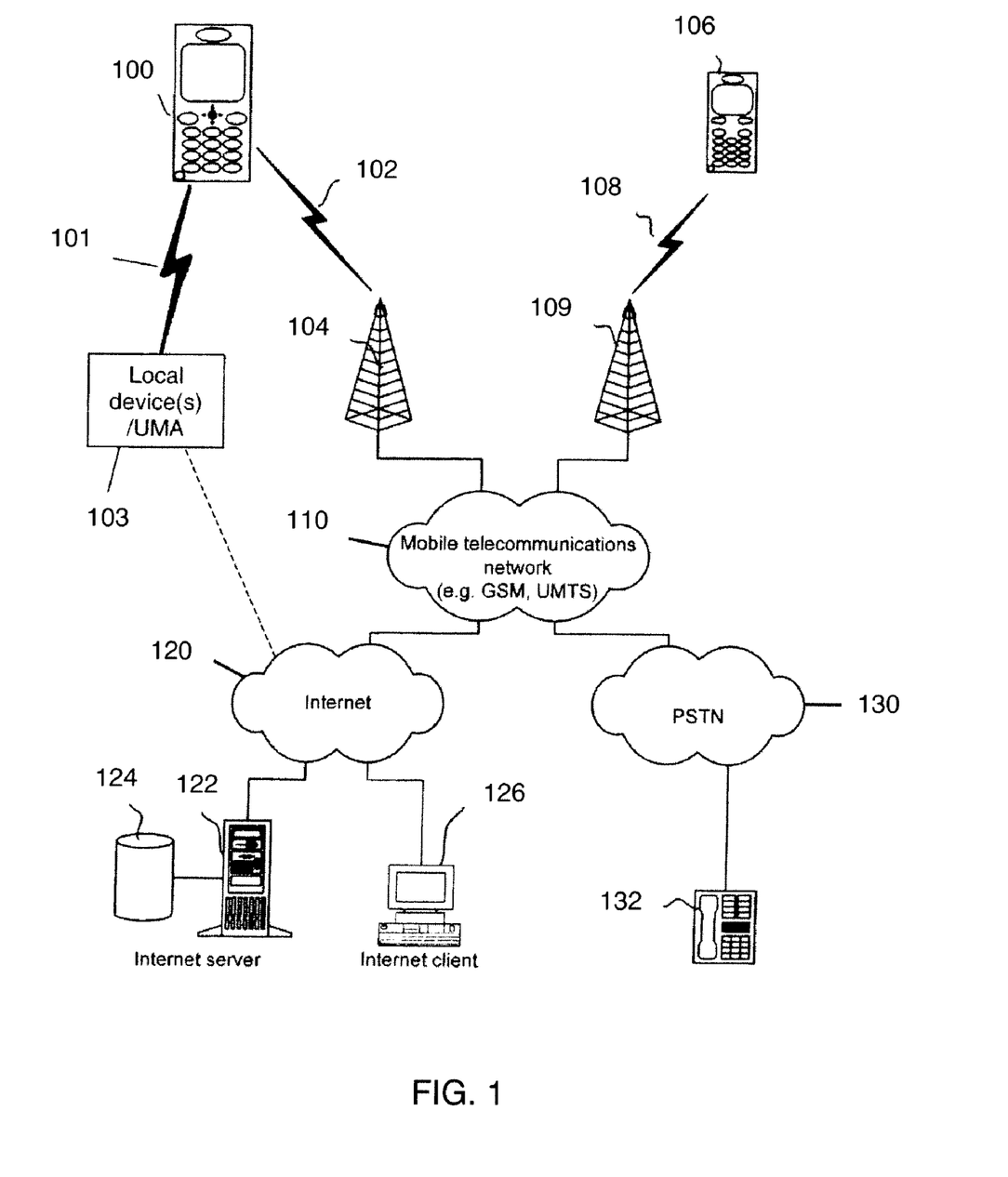
FIG. 1 shows a schematic illustration of a communication system, as an example in which aspects of the invention may be applied.

FIG. 1 illustrates a schematic illustration of a communications system, as an example, of an environment in which a communications device 100 incorporating features of an exemplary embodiment may be applied. Although aspects of the invention will be described with reference to the embodiments shown in the drawings and described below, it should be understood that these aspects could be embodied in many alternate forms of embodiments. In addition, any suitable size, shape or type of elements or materials could be used.

In the communication system of FIG. 1, various telecommunications services such as cellular voice calls, www/wap browsing, cellular video calls, data calls, facsimile transmissions, music transmissions, still image transmission, video transmissions, electronic message transmissions and electronic commerce may be performed between the mobile terminal 100 and other devices, such as another mobile terminal 106, a stationary telephone 132, or an internet server 122. It is to be noted that for different embodiments of the mobile terminal 100 and in different situations, different ones of the telecommunications services referred to above may or may not be available. The aspects of the invention are not limited to any particular set of services in this respect.

The mobile terminals 100, 106 may be connected to a mobile telecommunications network 110 through radio frequency (RF) links 102, 108 via base stations 104, 109. The mobile telecommunications network 110 may be in compliance with any commercially available mobile telecommunications standard such as GSM, UMTS, D-AMPS, CDMA2000, FOMA and TD-SCDMA.

The mobile telecommunications network 110 may be operatively connected to a wide area network 120, which may be the internet or a part thereof. An internet server 122 has data storage 124 and is connected to the wide area network 120, as is an internet client computer 126. The server 122 may host a www/hap server capable of serving www/hap content to the mobile terminal 100.

For example, a public switched telephone network (PSTN) 130 may be connected to the mobile telecommunications network 110 in a familiar manner. Various telephone terminals, including the stationary telephone 132, may be connected to the PSTN 130.

The mobile terminal 100 is also capable of communicating locally via a local link 101 to one or more local devices 103. The local link 101 may be any suitable type of link with a limited range, such as for example Bluetooth, a Universal Serial Bus (USB) link, a wireless Universal Serial Bus (WUSB) link, an IEEE 802.11 wireless local area network (WLAN) link, an RS-232 serial link, etc. The local devices 103 can, for example, be various sensors that can communicate measurement values to the mobile terminal 100 over the local link 101. The local devices 103 may be antennas and supporting equipment forming a WLAN implementing Worldwide Interoperability for Microwave Access (WiMAX, IEEE 802.16), WiFi (IEEE 802.11x) or other communication protocols. The WLAN may be connected to the internet. The mobile terminal 100 may thus have multi-radio capability for connecting wirelessly using mobile communications network 110, WLAN or both. Communication with the mobile telecommunications network 110 may also be implemented using WiFi, WiMax, or any other suitable protocols, and such communication may utilize unlicensed portions of the radio spectrum (e.g. unlicensed mobile access (UMA)). The above examples are not intended to be limiting, and any suitable type of link may be utilized.

Figure 2A:
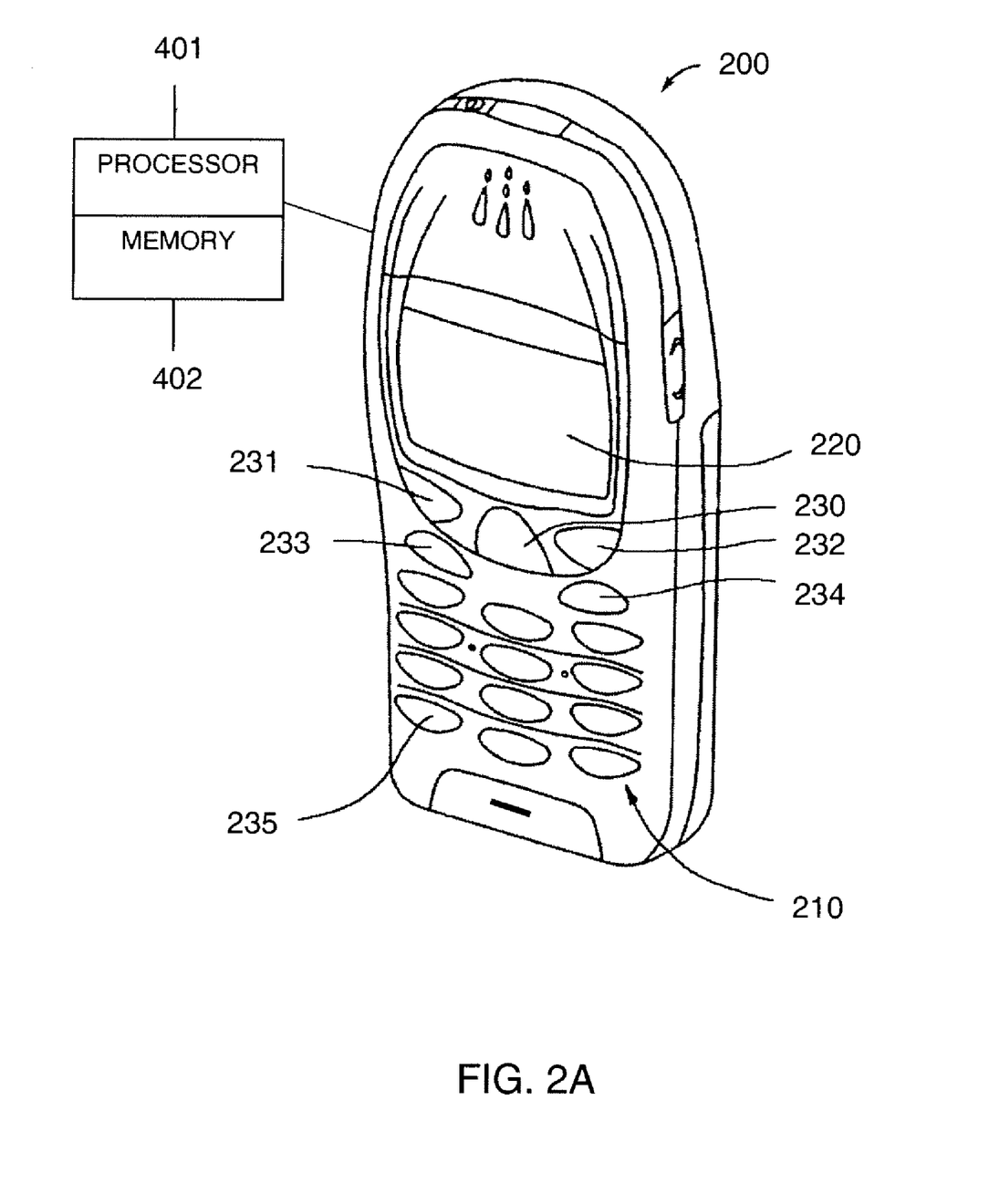
FIG. 2A shows a device incorporating features of an embodiment.

One embodiment 200 of a terminal 100 is illustrated in more detail in FIG. 2A. The terminal or mobile communications device 200 may have a keypad 210 and a display 220. The keypad 210 may include any suitable user input devices such as, for example, a multi-function/scroll key 230, soft keys 231, 232, a call key 233 and end call key 234 and alphanumeric keys 235. The display 220 may be any suitable display, such as for example, a touch screen display or graphical user interface. The display may be integral to the device 200 or the display may be a peripheral display connected to the device 200. A pointing device, such as for example, a stylus, pen or simply the user's finger may be used with the display 220. In alternate embodiments any suitable pointing device may be used. In other alternate embodiments, the display may be a conventional display. The device 200 may also include other suitable features such as, for example, a camera, loud speaker, connectivity port or tactile feedback features. The mobile communications device may have a processor 401 (see also FIG. 4) connected to the display for processing user inputs and displaying information on the display 220. A memory 402 (see also FIG. 4) may be connected to the processor 401 for storing any suitable information and/or applications associated with the mobile communications device 200 such as phone book entries, calendar entries, etc.

Figure 2B:
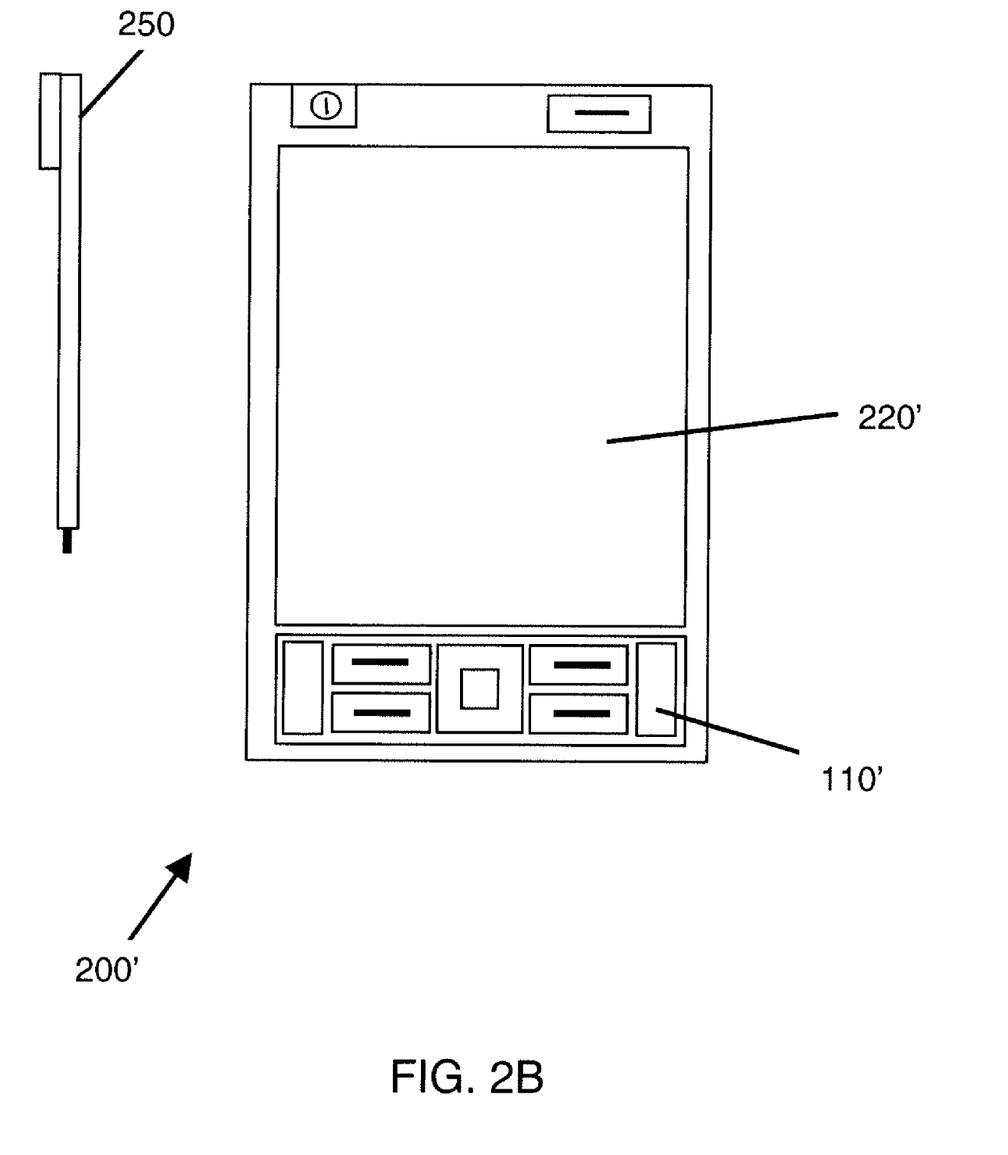
FIG. 2B shows another device incorporating features of an embodiment.

In one embodiment, the device 200, may be for example, a PDA style device 200' illustrated in FIG. 2B. The PDA 200' may have a keypad 210', a touch screen display 220' and a pointing device 250 for use on the touch screen display 220'. In still other alternate embodiments, the device may be a personal communicator, a tablet computer, a laptop or desktop computer, a television or television set top box, or any other suitable device capable of containing the display 220 and supported electronics such as the processor 140 and memory 150. The exemplary embodiments herein will be described with reference to the mobile communications device 200 for exemplary purposes only and it should be understood that the embodiments could be applied equally to any suitable device incorporating a display, processor, memory and supporting software or hardware.

Figure 3:
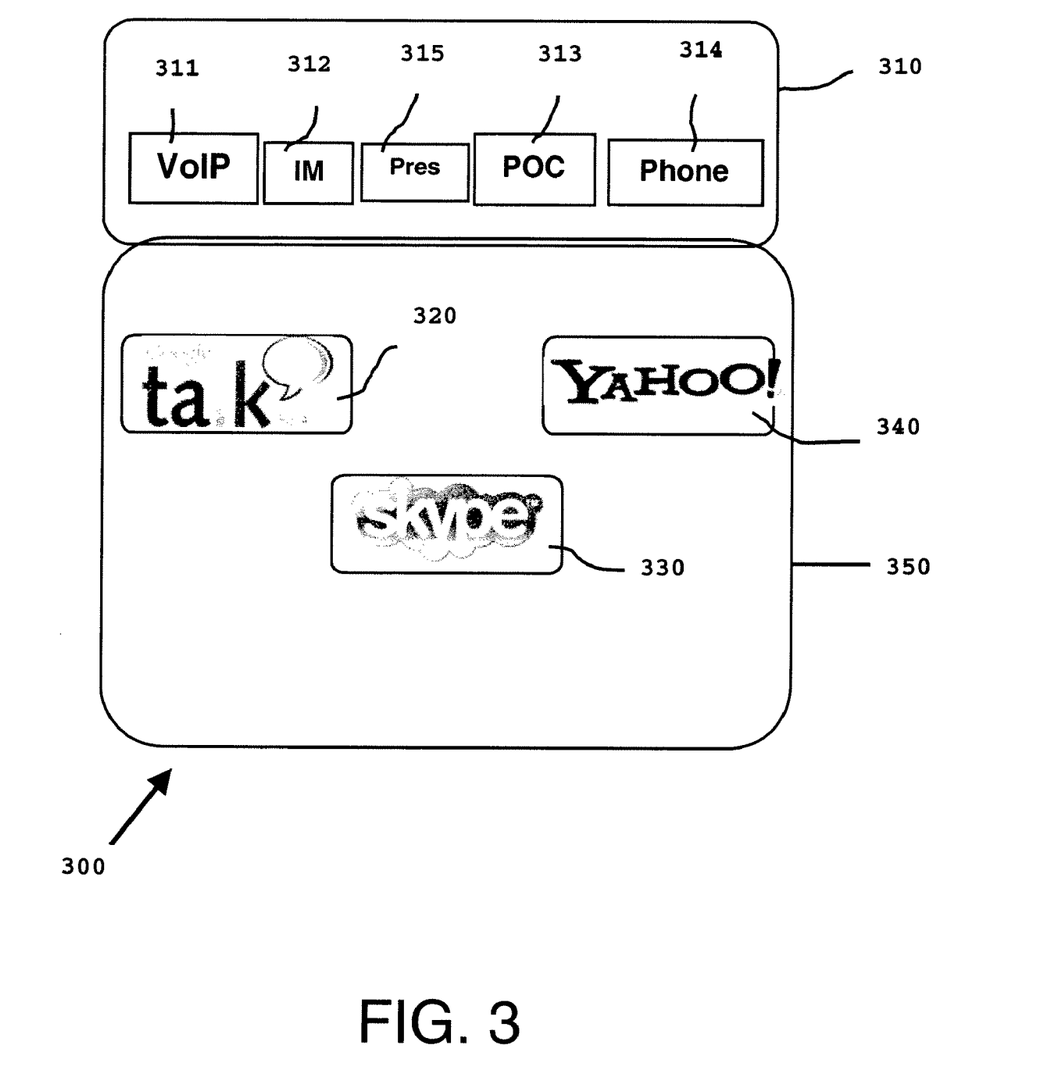
FIG. 3 illustrates a user interface incorporating features of an embodiment.
Figure 4:
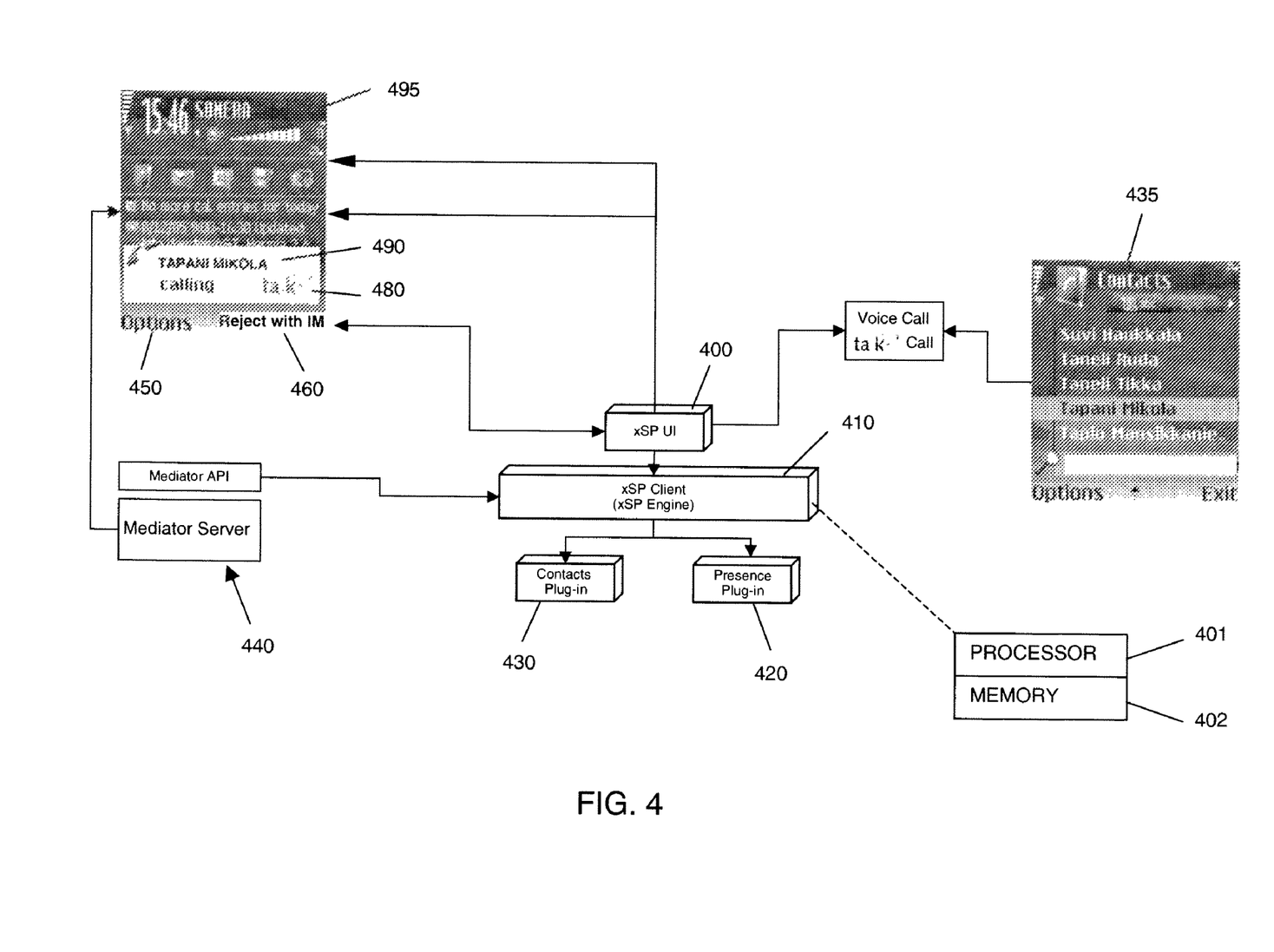
FIG. 4 illustrates a schematic diagram of a device incorporating features of an embodiment.

The device 200 may be configured to provide communications over multiple channels or protocols such as, for example, Voice Over IP (VoIP), instant messaging (IM), cellular phone services, wireless broadband services, SMS, push-to-talk over cellular and the like. Referring to FIG. 4, the device may include a service provider user interface 400 and a service provider client 410 that may be implemented through the processor 401, and memory 402. In alternate embodiments, the service provider user interface 400 and a service provider client 410 may be implemented in any suitable manner. The service provider user interface 400 may provide, via the display 220, a user of the device 200 with the information the user would receive when using a certain communication channel/protocol associated with that service provider. The service provider interface may also be configured to provide application inter-working between an active user interface 495 and inactive applications such as, for example, a contacts list or phone book 435. The service provider client 410 may manage the different service providers associated with the device. For example, the service provider client 410 may launch a service provider mediator application program interface 440 that identifies the channel/protocol and service provider of an incoming call for display on the device 200. The service provider client may also determine the presence of a user's contacts on a certain channel/protocol associated with a service provider via a presence plug-in 420 or provide a screen name of a contact associated with a service provider via a contacts plug-in 430. The multiple communication channels/protocols associated with the different service providers may be presented to a user of the device 200 through the display as can be seen in FIG. 3. In alternate embodiments, the different communication protocols and service providers may be displayed on or near keys of the keypad of the device and an indication of online or offline status may be provided by, for example, an illumination of an LED and/or key.

FIG. 3 illustrates one embodiment of a unified user interface 300 that includes a display of and links to some of the different communication channels/protocols and service providers that are available to be used or accessed with the device 200. As shown in FIG. 3, the user interface 300 may include two sections 310, 350. In alternate embodiments, the user interface 300 may include any suitable number of sections or areas containing any suitable information, menu items or selections available to a user.

In one embodiment, the first section 310 of the user interface 300 may display a menu or selection of any suitable number of communication channels/protocols such as, for example, Voice over IP 311, instant messaging 312 and push to talk over cellular 313, cellular communications 314 and the like. In alternate embodiments, the first section 310 may include any suitable information or menu items available to the user. A user may be able to scroll the menu of the first section 310 up, down, left or right using, for example, the multifunction key 230 or a pointing device, to access additional communication channels/protocols. The first section 310 may also include a presence feature 315 so a user may determine if a party to be communicated with (e.g. the user's contacts) is present on that communication channel/protocol. For example, if a user A is logged into a VoIP service provider "A" and wants to communicate with user B, user A can use the presence feature 315 to determine if user B is also logged into VoIP service provider "A". The presence feature 315 may gather information from the phone book through the presence plug-in 420 as described above. In alternate embodiments, the menu 310 may include any suitable items such as SMS and other protocols.

The second section 350 of the unified user interface 300 may display an indication of the different service providers associated with the different communication channels/protocols that are presented in the menu of the first section 310. The user interface 300 may be configured so that as a user scrolls through the menu of the first section 310 a list of different service providers associated with that communication protocol may be presented to the user for selection in the second section 350 of the user interface 300. For example, in FIG. 3 exemplary service providers for voice over IP 311 such as GOOGLE TALK™ 320, SKYPE™ 330 and YAHOO!® 340 that a user may select for communication are shown in section 350. Exemplary service providers that may be displayed when a user selects the instant messenger protocol 312 may include, for example, AOL® (America Online) instant messenger, YAHOO!® instant messenger, ICQ® instant messenger and MSN® (Microsoft Network) instant messenger. Any suitable service providers may be included for a respective one of the menu categories (e.g. 310-313) presented in the first section 310. In this example, the second section 350 of the user interface 300 is configured to display the logo or icon associated with a respective service provider. In alternate embodiments any suitable indicator of the service providers may be utilized.

In this example, the user interface 300 includes a first section 310 and a second section 350 as described above. However, in alternate embodiments, the user interface may include a single section incorporating all of the features of the first and second sections 310, 350. In other alternate embodiments, the features described above with respect to the first and second sections 310, 350 may be divided into more than two sections wherein each of the sections contains any combination of the features described above.

In one embodiment, a user of the device 200 of FIG. 2A may want to respond to an incoming call on a channel/protocol that is different than that being used by the incoming call. For example, a user may receive an incoming call via voice over IP and may want to respond to the incoming call with an instant message. The device 200 may facilitate (through the user's input) the response via another communication channel/protocol through, for example, the service provider client 410, the service provider user interface 400 and/or the soft keys 231, 232 of the device. In alternate embodiments, any suitable software, hardware and/or keys of the device may implement the response via another channel/protocol.

When an incoming call is received, the service provider user interface 400 may cause the display 220 to present a user interface such as the exemplary interface 495 shown in FIG. 4. The user interface 495 may include call identification information 470 such as, for example, a caller nickname 490 and/or a phone number and the service provider 470 (e.g. service provider brand logo or identification mark) associated with the call. In this example the GOOGLE TALK™ logo 480 is shown. In one embodiment, the caller nickname 490 may be a nickname assigned to the caller by the user of the device 200. The service provider user interface 400 may, through application inter-working, obtain the user defined nickname from the contact list 435. The contact list 435 may be a unified contact list or phonebook, as described in co-pending patent application entitled "UNIFIED CONTACT DATABASE", Ser. No. 11/468,163, the disclosure of which is incorporated herein by reference in its entirety, that correlates a nickname assigned to the caller by a user of the device 200 with the user names of the caller associated with communication protocols such as MMS, instant messaging and the like (e.g. the caller's user name for a particular service provider). The contact list 435 may allow the device 200 to determine what other channels/protocols are available for communication with the caller. For example, the presence plug-in may use information obtained from the contact list 435 to check or verify the presence of a caller on channels that are associated with that caller in the contact list 435.

The user interface 495 may also include soft key functions such as, for example, an options function 450 and a reply function 460. The options function may be associated with the left soft key 231 of the device 200 while the reply function 460 may be associated with the right soft key 232. In alternate embodiments the soft key functions may be associated with any suitable key. The reply function 460 may serve to decline an incoming call and to reply to that call via, for example, an instant message. In alternate embodiments, the reply function 460 may provide a reply via any suitable communication channel/protocol such as, for example, MMS, SMS or email associated with any suitable service provider. The communication channel/protocol and/or service provider associated with the reply function 460 may be pre-selected by a user. In alternate embodiments, the reply function 460 may present the user with a list of available communication channel/protocol and/or service providers upon rejection of an incoming call. The reply function 460 may present on the display which service provider is being used to reply to, for example, the incoming call. For example, the text associated with the reply function 460 (i.e. the text displayed above the respective soft key) may read "Reply with YAHOO!® IM". The reply function 460 may allow a user to decline a call and automatically send a reply message to the caller (with the press of one button) notifying the caller of, for example, the reason the call was declined.

The communication channel/protocol and service provider associated with the channel/protocol assigned to the reply function 460 may be user definable through, for example, any suitable settings menu of the device 200. For example, as shown in FIG. 4, a user may assign instant messaging to the reply function 460. In alternate embodiments, the channel/protocol assigned to the reply function may be defined during manufacture of the device 200. In other alternate embodiments, more than one channel/protocol may be assigned to the reply function. For example, when a user declines and responds to an incoming call via the reply function 460 an instant message and an SMS message may be sent in reply to the incoming call. In other alternate embodiments, the reply function may automatically reply to an incoming call with, for example, an instant message, an SMS message, an MMS message, an email or the like or any combination thereof, without a user initiating the reply. The auto-reply may be triggered in any suitable manner such as once the device 200 experiences a missed call, when the user pushes, for example, the "end call" button 234 to terminate the incoming call before answering it or when the call information is displayed on the device 200. The reply function may also be configured to send a reply message depending on a user's presence (e.g. status on a particular service provider and/or communication channel/protocol). For example, if the user's presence status is "away" or "do not disturb" the reply message may incorporate information written in the "do not disturb" message.

The message, such as for example the "do not disturb" message or any other suitable message, that is sent via the reply function 460 or in an auto-reply may also be user definable. For example, a user may assign the user defined message "In a meeting, I will call you later" to the reply function 460 so that when the user responds or reacts to the incoming call by activating the reply function 460 an instant message, SMS message and/or the like, including the text "In a meeting, I will call you later" will be sent to the caller in response to the incoming call in lieu if answering that incoming call (e.g. initiating a voice conversation with the caller by pressing, for example the call key 233 of the device 200). The text may automatically be attached to the message via the reply function 460. In alternate embodiments, when the user declines and responds to the incoming call via the reply function 460, a list of the predefined reply messages may be displayed so that the user may select a desired message to include in the reply. The list of predefined reply messages may be stored in the device 200 during manufacture. In alternate embodiments, the user of the device 200 may create the list of predefined reply messages. In the case of the auto-reply, the content of the auto-reply message may be selected from the list of predefined reply messages. The predefined messages may correspond to and contain different content for different groups of callers such as for example, family, friends, colleagues, etc.

Figure 5:
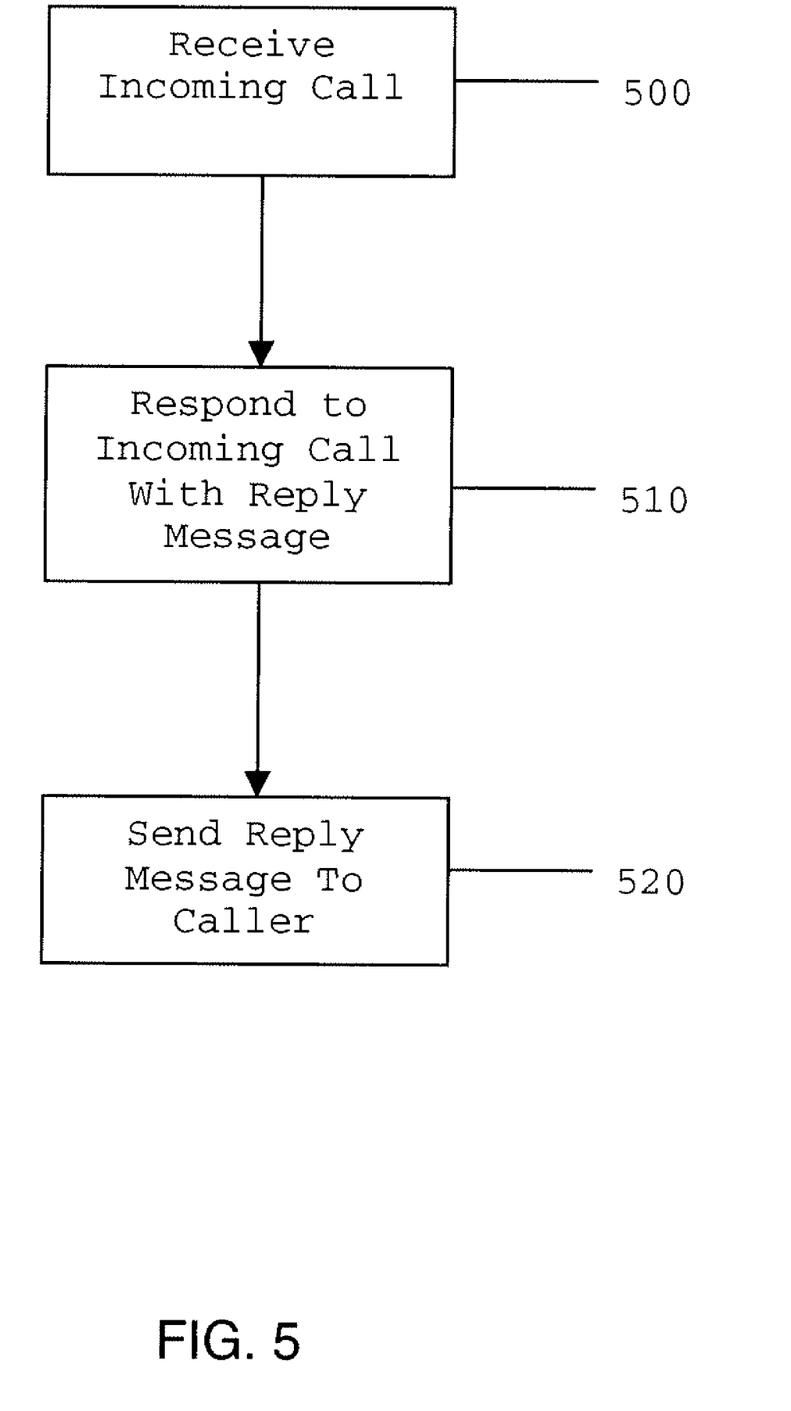
FIG. 5 shows a flow diagram in accordance with an embodiment.

In operation, when an incoming call is received by the device 200 (Block 500, FIG. 5), the service provider client 410 may identify the channel/protocol and service provider associated with the incoming call via the mediator application interface 440 and the contact list 435. In alternate embodiments, the service provider may be determined by the device 200 in any suitable manner. The service provider client 410 and the service provider user interface 400 may cause the service provider 470 to be displayed in the user interface 495 along with call identification information 490. The user may answer the incoming call via, for example the call key 233 or reject the call via, for example the call end key 234. The user may also decline and respond to the call so that a reply is sent upon declination via, for example a key such as soft key 232 associated with the reply function 460 (Block 510. FIG. 5). Where the call is declined and responded to through the reply function 460, a reply message(s) may be sent to the caller via another communication channel/protocol and or service provider (Block 520, FIG. 5). The service provider user interface 400 and service provider client 410 may through application inter-working determine via the contact list 435 the information needed to send the message. For example, as shown in FIG. 4, the service provider user interface 400 may look up the nickname 490 of the caller to determine the instant message service provider and screen name for the caller. The presence plug-in may determine what service providers the caller is logged on to, for example it may be determined that the caller is logged on to service provider "A" so that the reply message may be sent via service provider "A". If the caller is not logged on to service provider "A", a different service provider that the caller is logged on to may be automatically selected and used so that the caller receives the reply message. In alternate embodiments, the message may be sent when the caller is not logged on to the service provider, such as an instant message service provider, so that the caller receives the reply message when the caller logs on to the instant message service provider. In still other alternate embodiments, a first reply may be sent using one protocol and a second reply may be sent using a second protocol that is different than that of the first reply as a follow up response to the incoming message. The processor may automatically switch from the first protocol to the second protocol to send the follow up reply.

Figure 6:
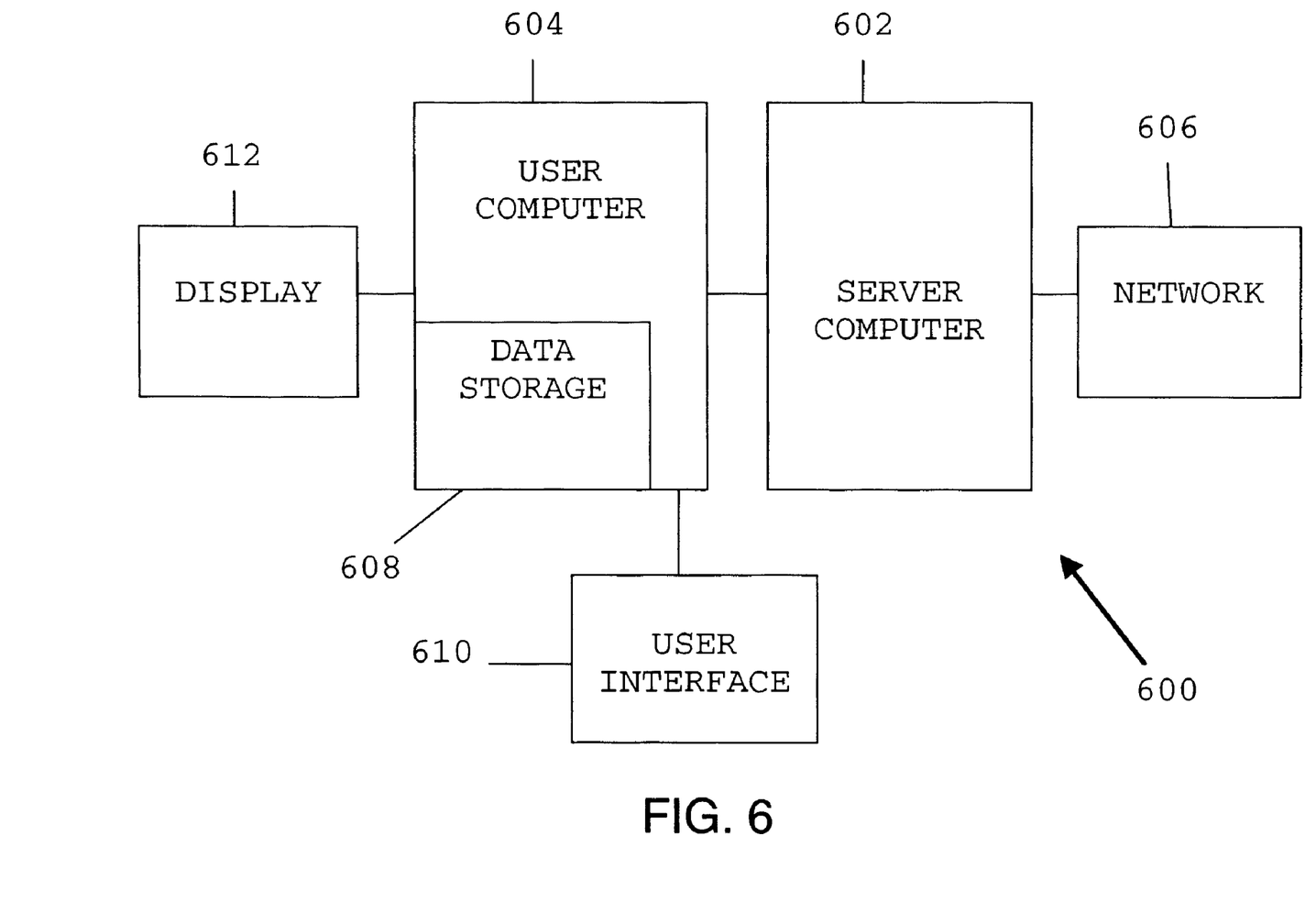
FIG. 6 is a block diagram of one embodiment of a typical apparatus incorporating features of the present invention that may be used to practice the present invention.

The disclosed embodiments may also include software and computer programs incorporating the process steps and instructions described above that are executed in different computers. FIG. 6 is a block diagram of one embodiment of a typical apparatus 600 incorporating features that may be used to practice the present invention. As shown, a computer system 602 may be linked to another computer system 604, such that the computers 602 and 604 are capable of sending information to each other and receiving information from each other. In one embodiment, computer system 602 could include a server computer adapted to communicate with a network 606. Computer systems 602 and 604 can be linked together in any conventional manner including, for example, a modem, hard wire or wireless connection, or fiber optic link. Generally, information can be made available to both computer systems 602 and 604 using a communication protocol typically sent over a communication channel or through a dial-up connection on ISDN line. Computers 602 and 604 are generally adapted to utilize program storage devices embodying machine readable program source code which is adapted to cause the computers 602 and 604 to perform the method steps of the present invention. The program storage devices incorporating features of the invention may be devised, made and used as a component of a machine utilizing optics, magnetic properties and/or electronics to perform the procedures and methods of the present invention. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 602 and 604 may also include a microprocessor for executing stored programs. Computer 602 may include a data storage device 608 on its program storage device for the storage of information and data. The computer program or software incorporating the processes and method steps incorporating features of the present invention may be stored in one or more computers 602 and 604 on an otherwise conventional program storage device. In one embodiment, computers 602 and 604 may include a user interface 610, and a display interface 612 from which features of the present invention can be accessed. The user interface 610 and the display interface 612 can be adapted to allow the input of queries and commands to the system, as well as present the results of the commands and queries.

It should be understood that the foregoing description is only illustrative of the invention. Various alternatives and modifications can be devised by those skilled in the art without departing from the invention. Accordingly, the disclosed embodiments are intended to embrace all such alternatives, modifications and variances which fall within the scope of the appended claims.

What is claimed is:

1. An apparatus comprising
a processor and a memory storing computer-readable instructions;
wherein the memory and stored computer-readable instructions are configured to, with the processor, cause the apparatus at least to:
detect an incoming communication to the apparatus from a calling device;
generate a notification of the incoming communication;
provide a programmable key configured to decline the incoming communication upon selection of the programmable key in response to the notification of the incoming communication;
in an instance in which a communication service provider is pre-selected, cause transmission of at least one reply communication in response to the selection of the programmable key as a reply to the incoming communication; and
in an instance in which a communication service provider is not pre-selected, provide selection of at least two communication service providers, and cause transmission of at least one reply communication by a communication service provider selected by a user.

2. The apparatus of claim 1, wherein the causing transmission of the at least one reply communication comprises indicating a service provider that is different from a service provider of the incoming communication.

3. The apparatus of claim 1, wherein the causing transmission of the at least one reply communication comprises basing the transmission on information obtained from caller identification.

4. The apparatus of claim 1, wherein the memory and the computer-readable instructions are further configured to, with the processor, cause the apparatus to cause display of information pertaining to a service provider associated with the incoming communication.

5. The apparatus of claim 1, wherein the programmable key comprises a soft key.

6. The apparatus of claim 1, wherein each of the at least one reply communication is associated with a different service provider than a service provider associated with the incoming communication.

7. The apparatus of claim 1, wherein the at least one reply communication is a predefined message.

8. The apparatus of claim 1, wherein the at least one reply communication is selected from a list of predefined messages.

9. The apparatus of claim 1, wherein the memory and the computer-readable instructions are further configured to, with the processor, cause the apparatus to determine a service provider of the incoming communication and cause display of the service provider.

10. The apparatus of claim 1, wherein causing transmission of the at least one reply communication comprises switching from using the service provider for the incoming communication to using a different service provider.

11. The apparatus of claim 1, wherein the memory and the computer-readable instructions are further configured, along with the processor, to cause transmission of a follow-up reply communication for a different service provider than the at least one reply communication.

12. A method comprising:
detecting an incoming communication to a mobile terminal from a calling device;
generating a notification of the incoming communication;
providing a programmable key configured to decline the incoming communication upon selection of the programmable key in response to the notification of the incoming communication; and
in an instance in which a communication service provider is pre-selected, causing transmission of at least one reply communication in response to the selection of the programmable key as a reply to the incoming communication; and
in an instance in which a communication service provider is not pre-selected, providing selection of at least two communication service providers, and causing transmission of at least one reply communication by a communication service provider selected by a user.

13. The method of claim 12, wherein the causing transmission of the at least one reply communication comprises using a service provider that is different from a service provider of the incoming communication.

14. The method of claim 12, wherein the reply communication is a predefined message.

15. The method of claim 12, wherein causing transmission of the at least one reply communication comprises sending at least one reply message based on information obtained from caller identification.

16. The method of claim 12, further comprising providing information pertaining to a service provider associated with the incoming communication.

17. The method of claim 12, wherein the programmable key comprises a soft key associated with the reply communication.

18. The method of claim 12, further comprising determining a service provider of the incoming communication and causing display of the service provider.

19. The method of claim 12, wherein causing transmission of the at least one replay communication comprises switching from using a service provider for the incoming communication to a different service provider.

20. The method of claim 12, further comprising causing transmission of a follow-up reply message for a different service provider than the at least one reply communication.

21. A computer program product comprising
at least one non-transitory computer-readable storage medium having computer-executable program code instructions stored therein, the computer-executable program code instructions comprising program code instructions to: detect an incoming communication to a mobile terminal from a calling device;
generate a notification of the incoming communication;
provide a programmable key configured to decline the incoming communication upon selection of the programmable key in response to the notification of the incoming communication; and in an instance in which a communication service provider is pre-selected, cause transmission of at least one communication in response to the selection of the programmable key as a reply to the incoming communication; and in an instance in which a communication service provider is not pre-selected, provide selection of at least two communication service providers, and cause transmission of at least one reply communication by a communication service provider selected by a user.

22. The computer program product of claim 21, wherein the computer-executable program code instructions further comprise program code instructions to cause display of information pertaining to the service provider associated with the incoming communication.

23. The computer program product of claim 21, wherein the programmable key comprises a soft key.

24. The computer program product of claim 21, wherein the at least one reply message is a predefined message.

* * * * *